(12) United States Patent
Rieth et al.

(10) Patent No.: US 10,110,297 B2
(45) Date of Patent: Oct. 23, 2018

(54) AIRCRAFT COMPRISING A PLURALITY OF ANTENNA UNITS

(71) Applicant: Airbus Defence and Space GmbH, Taufkirchen (DE)

(72) Inventors: Dominik Rieth, Ottobrunn (DE); Volker Ziegler, Hohenbrunn (DE); Christoph Heller, Taufkirchen (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 86 days.

(21) Appl. No.: 15/270,471

(22) Filed: Sep. 20, 2016

(65) Prior Publication Data
US 2017/0084987 A1   Mar. 23, 2017

(30) Foreign Application Priority Data
Sep. 23, 2015   (DE) .......................... 10 2015 218 299

(51) Int. Cl.
| H01Q 1/28 | (2006.01) |
| H04B 7/185 | (2006.01) |
| H01Q 21/00 | (2006.01) |
| H01Q 1/24 | (2006.01) |
| H04B 7/06 | (2006.01) |
| H04B 7/08 | (2006.01) |

(52) U.S. Cl.
CPC ........... *H04B 7/18506* (2013.01); *H01Q 1/24* (2013.01); *H01Q 1/286* (2013.01); *H01Q 21/00* (2013.01); *H04B 7/0689* (2013.01); *H04B 7/0871* (2013.01); *H04B 7/18504* (2013.01); *H04B 7/18508* (2013.01)

(58) Field of Classification Search
CPC ................ H04B 7/0689; H04B 7/0871; H04B 7/18504–7/18508; H01Q 1/286
See application file for complete search history.

(56) References Cited

U.S. PATENT DOCUMENTS

| 7,777,674 | B1 | 8/2010 | Haddadin et al. | |
| 9,419,330 | B1* | 8/2016 | Gans | H04B 7/0413 |
| 2007/0263748 | A1* | 11/2007 | Mesecher | H01Q 1/282 375/299 |
| 2013/0197739 | A1* | 8/2013 | Gallagher | B64F 5/60 701/31.5 |
| 2014/0206414 | A1* | 7/2014 | Oh | H04B 7/0404 455/562.1 |

OTHER PUBLICATIONS

B. Holter, "On the use of MIMO in aeronautical communications", ENRI Intl. Workshop on ATM/CNS. Tokyo, Japan, 2010.*
E. Haas, "Aeronautical channel modeling," in IEEE Transactions on Vehicular Technology, vol. 51, No. 2, pp. 254-264, Mar. 2002.*
German Office Action, dated Jul. 7, 2016, priority document.

* cited by examiner

*Primary Examiner* — Jessica Han
*Assistant Examiner* — Amal Patel
(74) *Attorney, Agent, or Firm* — Greer, Burns & Crain, Ltd.

(57) ABSTRACT

A flying machine or other vehicle includes at least two antenna units and a central control unit. In a first mode of operation, the two antenna units send and/or receive signals independent of each other in different, non-overlapping frequency bands. The central control unit is adapted to control the two antenna units in a second mode of operation such that the two antennas transmit and/or receive a common signal in a common frequency band using a Multiple Input Multiple Output transmission technique.

12 Claims, 6 Drawing Sheets

AIRCRAFT COMPRISING A PLURALITY OF ANTENNA UNITS

CROSS-REFERENCES TO RELATED APPLICATIONS

This application claims the benefit of the German patent application No. 102015218299.1 filed on Sep. 23, 2015, the entire disclosures of which are incorporated herein by way of reference.

TECHNICAL FIELD

This document relates to an aircraft comprising a plurality of antenna units. The disclosure relates, in particular, to aircraft comprising a plurality of antenna units which each transmit and/or receive signals, independently of one another, that are in different, non-overlapping frequency bands.

BACKGROUND OF THE INVENTION

A large number of antennae are conventionally built into aircraft, for example, airplanes or helicopters. These antennae are arranged at various points on the aircraft fuselage or on the airfoils and thereby perform a wide variety of functions.

A first application of antennae in aircraft involves data communication. In this case, corresponding antennae make it possible to exchange speech, images or other user data between the aircraft and (a) another aircraft, (b) a satellite communication system, or (c) a base station, for example a tower, a gate or an airport terminal. Data is communicated in frequency ranges of a few MHz up to a few thousand MHz.

A second application of antennae in aircraft involves position determination. Corresponding antennae make it possible to determine, for example, the height above ground level (e.g., radar altimeter (RALT)) or the absolute position above sea level (e.g., Global Positioning System (GPS)). Other applications based on relative position determination include instrument landing systems (e.g., instrument landing system (ILS)) or collision warning and avoidance systems (e.g., traffic collision avoidance system (TCAS)). Depending on the application, frequency bands of up to several GHz are used.

Other applications of antennae in aircraft include, for example, weather radars (e.g., WXR) or other systems which increase air safety. Depending on the application scenario, individual monopole or dipole antennae, or what are known as antenna arrays can be used. In order to improve the failsafe performance of the corresponding systems, redundant communication systems comprising antennae which are correspondingly redundant are provided in the majority of aircraft.

Integrating additional antenna units in aircraft is time-consuming, expensive and limited by factors such as weight, size and power consumption. Therefore, if possible, retrofitting additional antenna units should be avoided.

There is a need to provide an aircraft which comprises a plurality of antenna units and allows data communication with a base station (e.g., a tower, a gate or an airport terminal) at a relatively fast transmission speed.

SUMMARY OF THE INVENTION

The disclosure relates to an aircraft comprising at least two antenna units and a central control unit. The at least two antenna units are each designed, in a first mode of operation, to transmit and/or receive signals, independently of one another, that are in different, non-overlapping frequency bands. Furthermore, the central control unit is set up or configured to control the at least two antenna units in a second mode of operation such that the antenna units transmit and/or receive a common signal in a common frequency band by means of multiple-input multiple-output (MIMO) transmission technology.

The aircraft can be any type of manned aircraft (e.g., an airplane or a helicopter) or an unmanned aircraft (e.g., a drone). Furthermore, the aircraft can be suitable for a wide variety of civil and/or military applications.

One antenna unit or the two antenna units can each comprise one antenna element (e.g., a monopole or dipole antenna) or a plurality of antenna elements (e.g., an antenna array). Additionally, each antenna unit may comprise a driver circuit for modulating the signals to be transmitted, for demodulating received signals or for controlling the transmitting power.

In a first mode of operation, the two antenna elements can perform different functions from one another. As has already been discussed in the introductory part of this document, one of the two antenna units can be set up or configured to transmit and/or receive signals in a first mode of operation in order to perform one of the following functions: radar altimeter, weather radar, instrument landing system, position determination using a global satellite navigation system, or a collision warning and avoidance system. One of the two antenna units can also be set up or configured in a first mode of operation to allow data to be transmitted from and/or to a base station, another aircraft or a satellite communication system. In this case, the base station can be a tower, a gate or an aircraft on the airfield, for example.

Providing a central control unit makes it possible to put the two antenna units into a second mode of operation in which multi-antenna MIMO communication is possible as a result of the two antenna units being actuated at the same time. This means that it is possible to increase the data rate at a constant band width and thus the spectral efficiency. The quality of the received signal can in turn be improved at a constant data rate, and this makes bit errors less frequent, for example. In this manner, the antenna units present in the aircraft are used therein and multi-antenna MIMO communication is made possible, without having to build additional antenna units into the aircraft.

In this document, the term "MIMO transmission technology" is used as an umbrella term which covers both multiple-input single-output (MISO) data transmission from the aircraft to an external antenna unit and single-input multiple-output (SIMO) data transmission from an external antenna unit to the aircraft. In this case, the central control unit can be set up or configured to control the at least two antenna units in a manner corresponding to the second mode of operation such that the antenna units transmit the common signal to an external antenna unit comprising just one antenna element by means of MISO transmission technology. The central control unit can also be set up or configured to control the at least two antenna units in a manner corresponding to the second mode of operation such that the antenna units receive the common signal from an external antenna unit comprising just one antenna element by means of SIMO transmission technology.

The control unit comprises an arithmetic-logic unit and one or more volatile or non-volatile memory units. The arithmetic-logic unit is, for example, an all-purpose computer or a piece of programmable digital hardware, such as a digital signal processor (DSP) or a field-programmable gate array (FPGA). The control unit can draw its power from the on-board network of the aircraft or from its own power supply.

In any case, the central control unit is set up or configured to support and enable the MIMO function of the two antenna units in the second mode of operation. In particular, the central control unit is set up or configured to merge data streams from the common signal, the data streams being received by the various antenna units. Conversely, the central control unit is set up or configured to split a data stream, which is intended to be transmitted by means of the multi-antenna system formed by the two antenna units, into two data streams which are supplied to the two antenna units, respectively. Furthermore, the central control unit can take on further tasks which are typical of MIMO, e.g., precoding, beam forming, channel estimating and estimating interference caused by other communication participants.

In order to actuate the antenna units in a manner corresponding to the second mode of operation, the central control unit can be electrically connected to the antenna units. Alternatively or additionally, the central control unit may comprise a radio module for establishing radio links to the antenna units. If the antenna units also comprise corresponding radio modules, there is no need for extensive cabling in the aircraft in order to communicate with the radio module of the central control unit.

The central control unit can be set up or configured to control the at least two antenna units in a manner corresponding to the second mode of operation when the aircraft is on the ground. Conversely, the two antenna units can be set up or configured to transmit and/or receive signals in a manner corresponding to the first mode of operation when the aircraft is in the air. Many antenna units in an aircraft, such as antenna units in a radar altimeter, an instrument landing system, a collision warning and avoidance system or a weather radar, are only required when the aircraft is in the air. Therefore, switching into the second mode of operation can improve MIMO data transmission, without this having an adverse effect on the function of the antenna units during flight.

The central control unit can be set up or configured to control the at least two antenna units in the second mode of operation in a coherent manner Supplying a common clock pulse means that the split data streams can be synchronically transmitted and/or received from and/or by the two antenna units.

Each antenna unit can be electrically connected to the central control unit by means of a particular communication module. Furthermore, the communication modules can be set up or configured to actuate the at least two antenna units in a manner corresponding to the second mode of operation. If an antenna unit comprises more than one antenna element, it may be necessary to electrically connect each of the antenna elements of the corresponding antenna unit to the central control unit by means of a separate communication module.

Each communication module may comprise a software-defined radio (SDR) module. Using an SDR module means that some of the signal processing of the communication modules and/or the central control unit can be carried out using software. In this manner, the actuation of the individual antenna units can be altered in a simple and flexible manner, without having to replace corresponding hardware components. The communication modules can be arranged so as to be distributed in the aircraft in the vicinity of the respective antenna units. Alternatively, the communication modules can be arranged in a cluster in a separate region of the aircraft. The alternative mentioned last is advantageous in that the coherent clocking required for the coherent actuation of the two antenna units in the second mode of operation can be achieved by means of a short and simple SDR link. This can reduce the amount of additional cabling required in the aircraft.

The disclosure also relates to a method for actuating at least two antenna units in an aircraft. In this method, the at least two antenna units are actuated in a manner corresponding to a first mode of operation. In the first mode of operation, the at least two antenna units transmit and/or receive signals, independently of one another, that are in different, non-overlapping frequency bands. The method also comprises actuating the at least two antenna units by means of central control unit in a manner corresponding to a second mode of operation, in which the at least two antenna units transmit and/or receive a common signal in a common frequency band by means of multiple-input multiple-output (MIMO) transmission technology. The central control unit can optionally automatically detect when the aircraft has landed and switch between the first and the second mode of operation.

It should be noted that the use of various antenna units described in this document for enabling MIMO communication is not limited to aircraft per se. The described methods and devices can also be applied to other vehicles, such as cars, trucks or floating platforms, including ships or submarines.

It should also be noted that the methods, devices and systems described in this document can be used alone or in combination with other methods, devices and systems described in this document. Furthermore, any aspects of the methods, devices and systems described in this document can be combined with one another in a number of different ways. In particular, the features of the claims can be combined with one another in a number of different ways.

BRIEF DESCRIPTION OF THE DRAWINGS

The invention will be described in more detail below with reference to the drawings, in which.

DETAILED DESCRIPTION OF THE PREFERRED EMBODIMENTS

Figure 1:
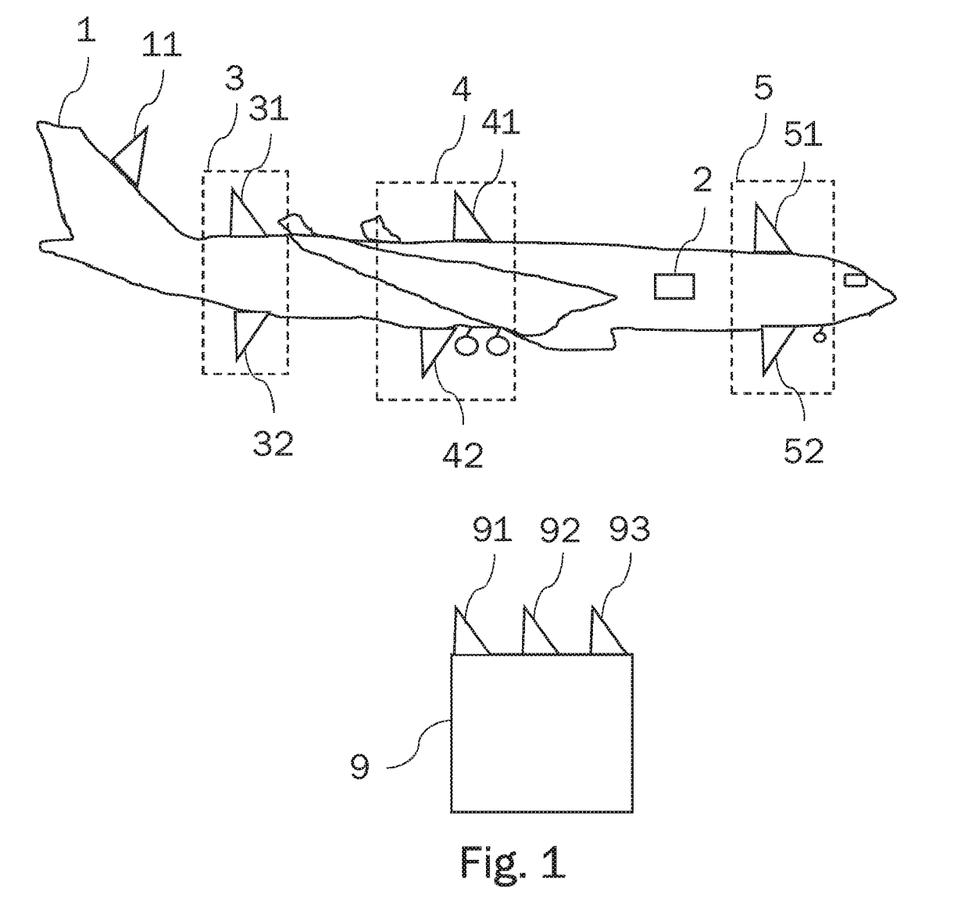
FIG. 1 is a schematic view of an example aircraft and an external antenna unit.

FIG. 1 is a schematic view of an example aircraft 1. The aircraft 1 comprises three antenna units 3, 4, 5 each comprising two antenna elements 31, 32, 41, 42, 51, 52. By way of example, the antenna elements 31, 32, 41, 42, 51, 52 are arranged on the upper side and lower side (or alternatively the left and right side) of the aircraft fuselage. The number of antenna units 3, 4, 5, the number of antenna elements 31, 32, 41, 42, 51, 52 and the geometric arrangement thereof on the aircraft 1 can of course be selected in a purely random manner and only represent one of four embodiments of the present invention.

The three antenna units 3, 4, 5 can have different functions. By way of example, antenna unit 3 is used for transmitting data from and to a satellite communication system, antenna unit 4 is part of a collision warning and avoidance system, and antenna unit 5 functions as a weather radar in order to avoid flying through storms and so that it is possible to assess expected turbulence.

FIG. 1 also shows a central control unit 2 which can actuate three antenna units 3, 4, 5 in the same manner as it can actuate a single multi-antenna system. Therefore, the central control unit 2 makes it possible to switch from a first mode of operation of the three antenna units 3, 4, 5, in which the antenna units transmit and/or receive signals independently of one another, into a second mode of operation, in which the antenna units function as a standard multi-antenna system and transmit and/or receive a common signal by means of multiple-input multiple-output (MIMO) transmission technology.

As indicated by the extended undercarriage of the aircraft 1, the aircraft 1 is on the ground, for example on an airfield. FIG. 1 also shows an examplar external antenna unit 9 comprising three antenna elements 91, 92, 93. Antenna unit 9 is, for example, a wireless local area network (WLAN) router which communicates with the aircraft 1 in accordance with the IEEE 802.11 standard. In particular, the WLAN router 9 can produce, by means of its three antenna elements 91, 92, 93, a 6×3 MIMO link for transmitting data to and from the multi-antenna system 3, 4, 5 of the aircraft. The WLAN router 9 is located at an airport gate or an airport terminal, for example.

In the illustrated situation, in which the aircraft 1 is on the airfield, the function of the collision warning and avoidance system or of the weather radar is not required. The combined actuation of the antenna units 3, 4, 5 means that the transmission data rate is higher by comparison with the situation in which only a single antenna unit 11 communicates with the WLAN router 9. Alternatively, the single antenna unit 11 can also be integrated in the MIMO transmission, in order to improve the 7×3 MIMO link to the WLAN router 9.

In the illustrated example, the various antenna units 3, 4, 5 operate at the same frequency for the MIMO transmission when in the second mode of operation, and all of the antenna elements 31, 32, 41, 42, 51, 52 are actuated in a coherent manner By means of the central control unit 2, the three antenna units 3, 4, 5 can be switched back into the first mode of operation and can assume their original function once again. Switching back into the first mode of operation can occur before or during start-up of the aircraft 1, for example.

Figure 2:
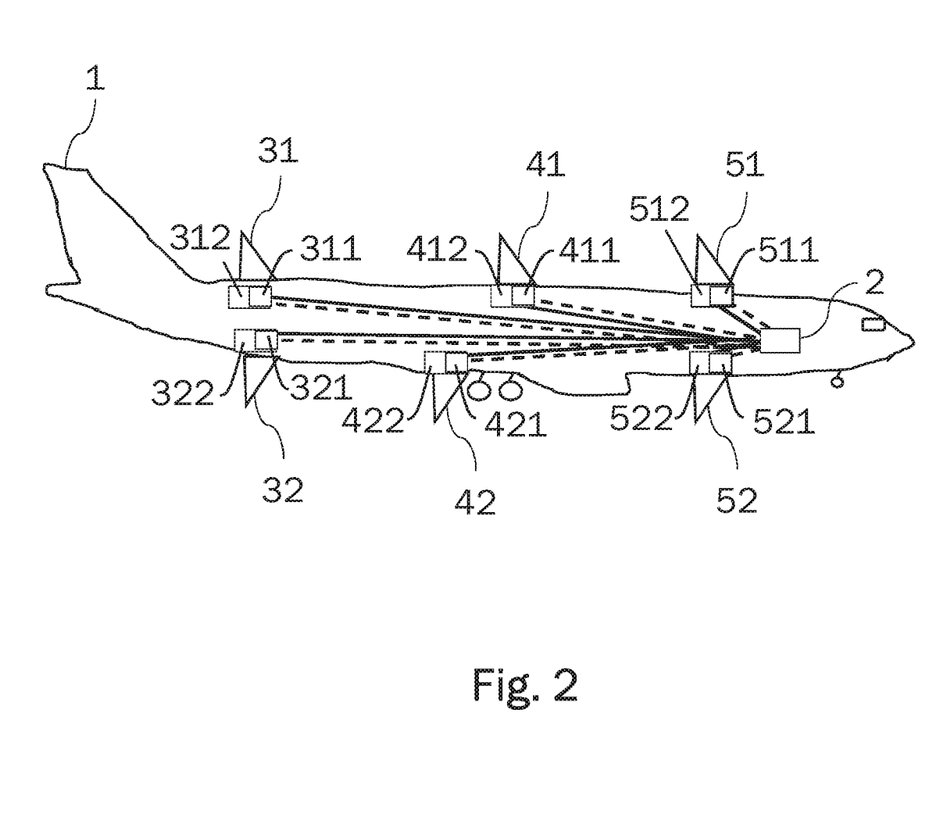
FIG. 2 is a schematic view of an example aircraft comprising three antenna units and a central control unit.
Figure 3:
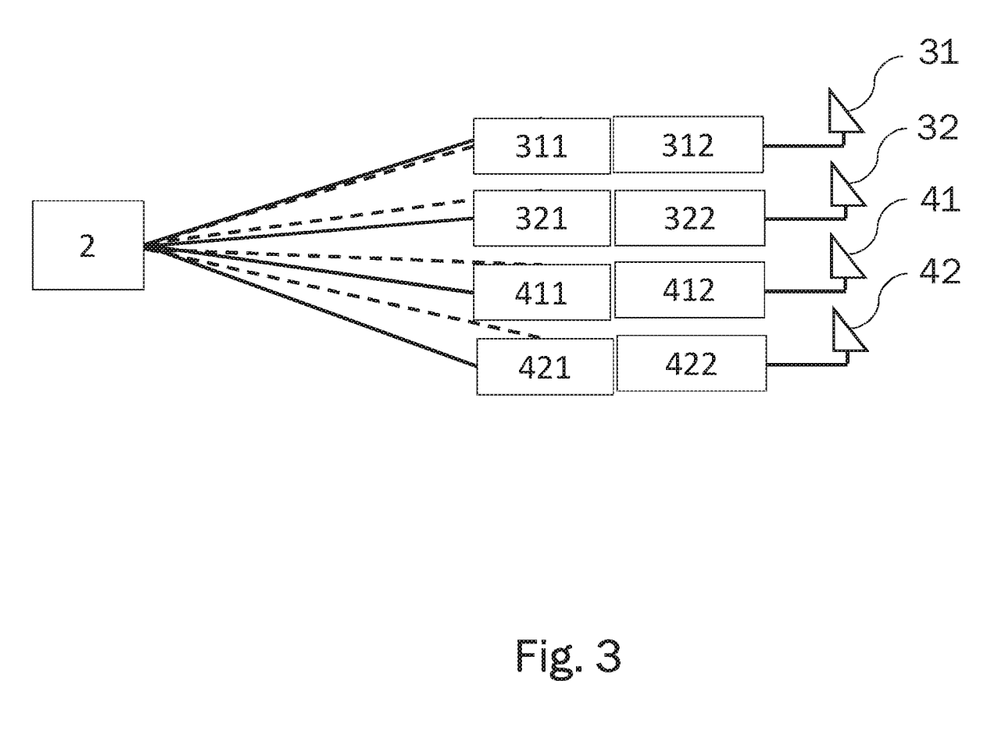
FIG. 3 shows four antenna elements connected to a central control unit by means of communication modules.

FIG. 2 and FIG. 3 show a possible first embodiment in which the central control unit 2 is electrically connected to the antenna elements 31, 32, 41, 42, 51, 52 by means of communication modules 311, 321, 411, 421, 511, 521. FIG. 3 does not show the two communication modules 511, 521 and the associated antenna elements 51, 52. The communication modules 311, 321, 411, 421, 511, 521 are connected to the control unit 2 by means of a data bus, which is indicated by continuous lines. Inter alia, the user data received or transmitted by the antenna elements 31, 32, 41, 42, 51, 52 are transmitted via the data bus. In the illustrated example, the communication modules 311, 321, 411, 421, 511, 521 are implemented by means of software-defined radio (SDR) platforms which are connected to the central control unit 2 by means of SDR links. The SDR links are indicated in FIG. 2 and FIG. 3 by dashed lines and ensure coherent clocking of the distributed SDR platforms. As shown in FIG. 2, the communication modules 311, 321, 411, 421, 511, 521 are arranged in the aircraft 1 in direct proximity to the antenna elements 31, 32, 41, 42, 51, 52. Additional transmitting and receiving modules 312, 322, 412, 422, 512, 522 can optionally be provided between the communication modules 311, 321, 411, 421, 511, 521 and the antenna elements 31, 32, 41, 42, 51, 52. As shown in FIG. 3, the communication modules 311, 321, 411, 421, 511, 521 and optionally the transmitting and receiving modules 312, 322, 412, 422, 512, 522 are connected to the corresponding antenna elements 31, 32, 41, 42, 51, 52 by means of radio frequency (RF) links.

Figure 4:
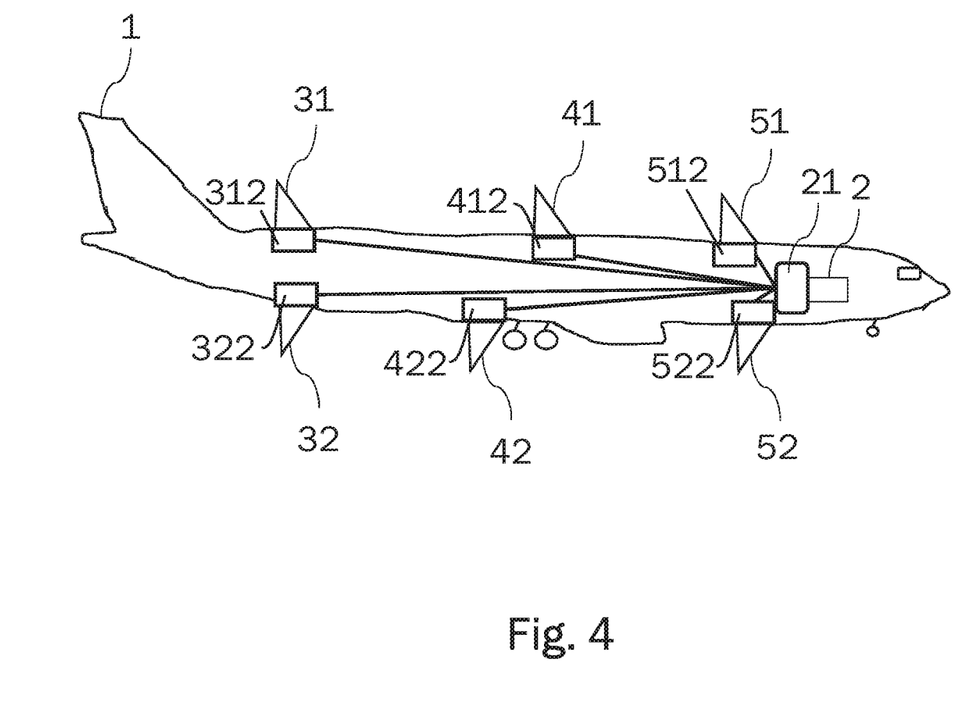
FIG. 4 is a schematic view of an example aircraft comprising three antenna units and a central control unit.
Figure 5:
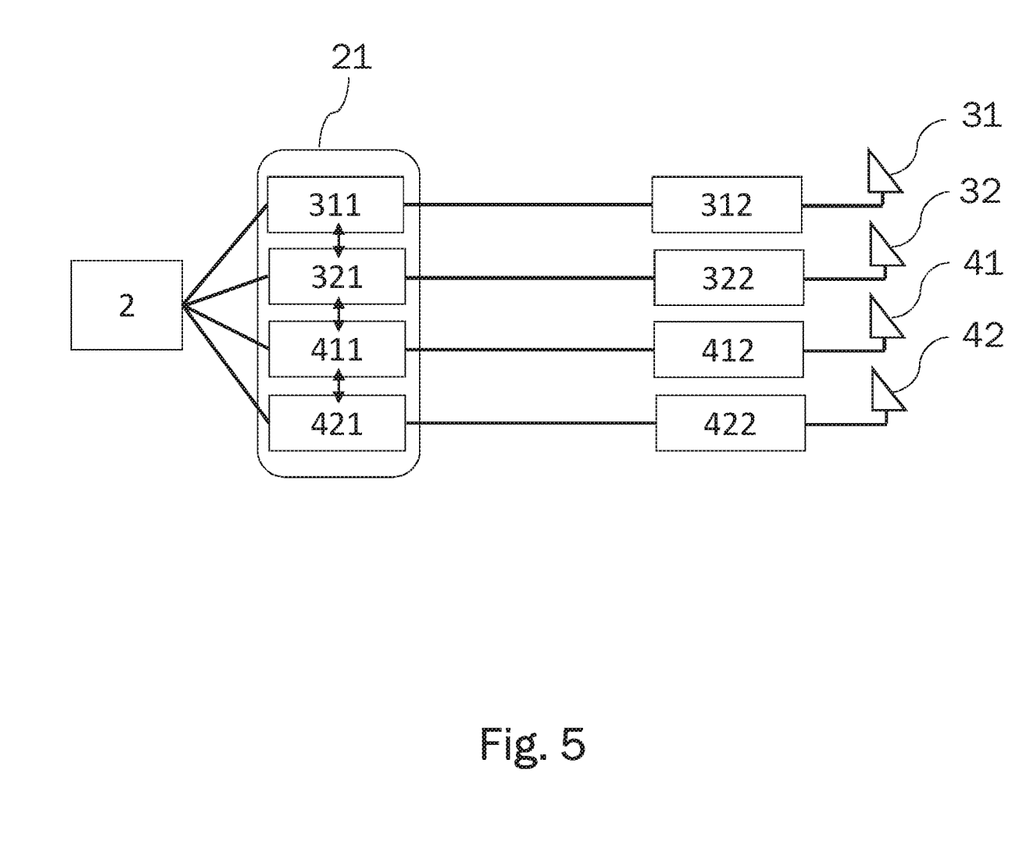
FIG. 5 shows four antenna elements connected to a central control unit by means of communication modules.

FIG. 4 and FIG. 5 show a possible second embodiment. In FIG. 4 and FIG. 5, the same reference numerals denote like or similar devices as the reference numerals in FIG. 2 and FIG. 3. The second embodiment differs from the first embodiment, in particular, in that the SDR platforms 311, 321, 411, 421, 511, 521 are arranged in a central SDR cluster 21. As shown in FIG. 4, the SDR cluster 21 can be arranged in proximity to the central control unit 21. Alternatively, the central SDR cluster 21 can also be arranged at any other location in the aircraft 1. According to the second embodiment, only the transmitting and receiving modules 312, 322, 412, 422, 512, 522 are arranged in proximity to the antenna elements 31, 32, 41, 42, 51, 52.

Digital or analog signals, for example, can be exchanged between the SDR platforms 311, 321, 411, 421, 511, 521 and the distributed transmitting and receiving modules 312, 322, 412, 422, 512, 522 by means of coaxial cables or optical waveguides. Communication can be carried out in accordance with the Common Public Radio Interface (CPRI) standard or the Open Base Station Architecture Initiative (OBSAI) standard, for example.

The central SDR cluster 21 makes is possible to arrange the SDR platforms 311, 321, 411, 421, 511, 521 in the aircraft 1 in a compact and efficient manner The coherent links between the individual SDR platforms 311, 321, 411, 421, 511, 521 can be produced quickly and simply. In particular, in the second embodiment, there is no need for SDR links between the central control unit 2 and the SDR cluster 21, but rather only SDR links within the SDR cluster 21 are required, and this is indicated by double-headed arrows in FIG. 5.

Figure 6:
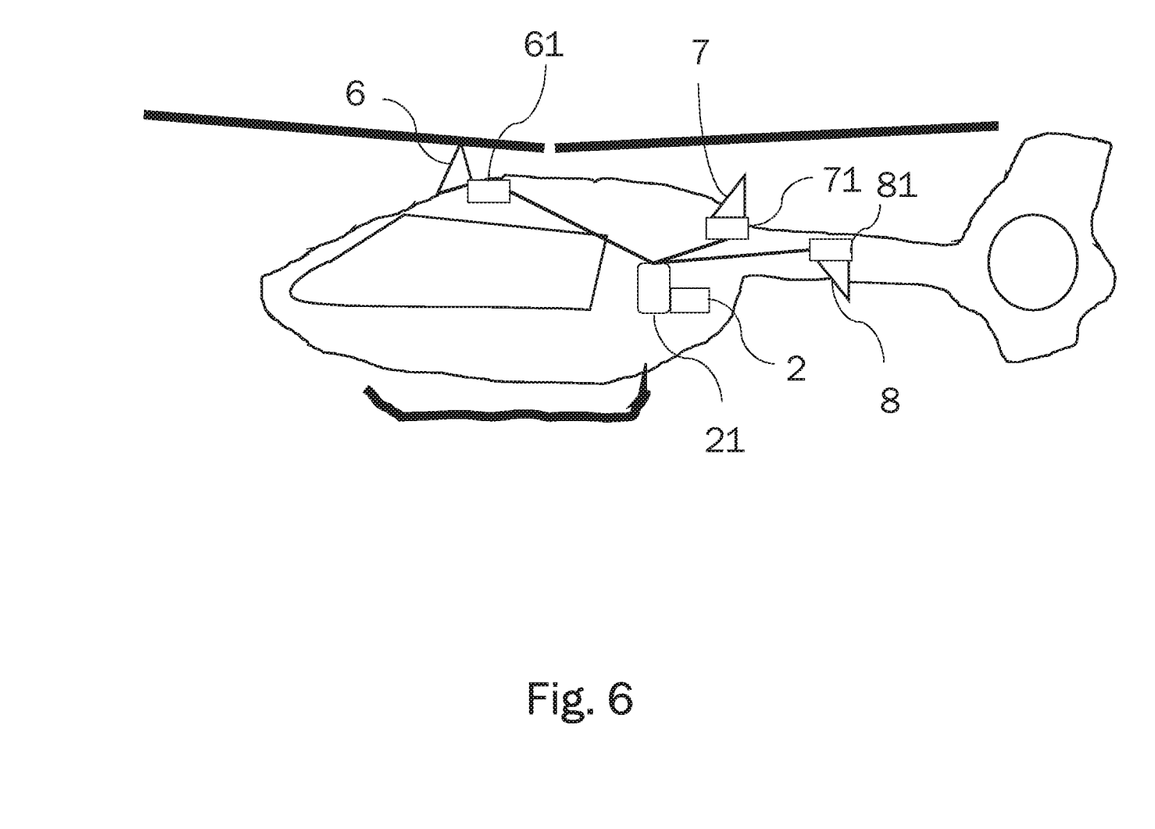
FIG. 6 is a further schematic view of an example aircraft comprising three antenna units and a central control unit.

FIG. 6 shows another possible application scenario in a helicopter. In this case, three antenna units 6, 7, 8 are actuated by means of a central control unit 2 via a central SDR cluster 21 in order to form a multi-antenna system and allow MIMO data transmission to other communication participants by means of the antenna units 6, 7, 8. In the example shown in FIG. 6, the antenna elements 6, 7, 8 are connected to the SDR cluster 21 by means of the transmitting and receiving modules 61, 71, 81.

The present invention is not limited to the illustrated embodiments. In particular, it should be noted that the description and the figures are only supposed to demonstrate the principle of the proposed methods, devices and systems.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
   at least two antenna units and
   a central control unit, wherein,
   in a first mode of operation, the at least two antenna units are configured to transmit and/or receive signals, independently of one another, that are in different, non-overlapping frequency bands, and,
   in a second mode of operation, the central control unit is configured to control the at least two antenna units such that said antenna units transmit and/or receive a common signal in a common frequency band by means of multiple-input multiple-output transmission technology, wherein the central control unit is set up to control the at least two antenna units in a manner corresponding to the second mode of operation when the aircraft is on the ground, wherein the at least two antenna units are set up to transmit and/or receive signals in a manner corresponding to the first mode of operation when the aircraft is in the air, and wherein the central control unit automatically detects when the aircraft has landed and switches the mode of operation.

2. The aircraft of claim 1, wherein the central control unit is configured to control the at least two antenna units in a manner corresponding to the second mode of operation such that said antenna units transmit the common signal to an external antenna unit comprising just one antenna element by means of multiple-input single-output transmission technology.

3. The aircraft of claim 1, wherein the central control unit is configured to control the at least two antenna units in a manner corresponding to the second mode of operation such that said antenna units receive the common signal from an external antenna unit comprising just one antenna element by means of single-input multiple-output transmission technology.

4. The aircraft of claim 1, wherein one of the at least two antenna units is or configured to transmit and/or receive signals in the first mode of operation so as to perform one of the following functions: radar altimeter, weather radar, instrument landing system, position determination using a global satellite navigation system, or a collision warning and avoidance system.

5. The aircraft of claim 1, wherein one of the at least two antenna units comprises one or more antenna elements.

6. The aircraft of claim 1, wherein the central control unit is configured to control the at least two antenna units in the second mode of operation in a coherent manner.

7. The aircraft of claim 1, wherein each antenna unit is electrically connected to the central control unit by means of a particular communication module, and the communication modules are or configured to actuate the at least two antenna units in a manner corresponding to the second mode of operation.

8. The aircraft of claim 7, wherein each communication module comprises a software-defined radio module.

9. The aircraft of claim 7, wherein the communications modules are arranged so as to be distributed in the aircraft in the vicinity of the respective antenna units.

10. The aircraft of claim 7, wherein the communication modules are arranged in a cluster in a separate region of the aircraft.

11. A method for actuating at least two antenna units in an aircraft, the method comprising:
    actuating the at least two antenna units in a manner corresponding to a first mode of operation, in which the at least two antenna units transmit and/or receive signals, independently of one another, that are in different, non-overlapping frequency bands, and
    actuating the at least two antenna units by means of a central control unit in a manner corresponding to a second mode of operation, in which the at least two antenna units transmit and/or receive a common signal in a common frequency band by means of multiple-input multiple-output transmission technology
    controlling the at least two antenna units in a manner corresponding to the second mode of operation when the aircraft is on the ground by means of the central control unit;
    transmitting and/or receiving signals in a manner corresponding to the first mode of operation when the aircraft is in the air by means of the at least two antenna units;
    further comprising:
    automatically detecting when the aircraft has landed by means of the central control unit and switching the mode of operation.

12. The method of claim 11, further comprising:
    switching between the first and the second mode of operation by means of the central control unit.

* * * * *